Dec. 29, 1936.   G. A. RUTKOSKIE   2,065,749
PLATEN JOB PRESS OF THE REVOLVING DISK TYPE
Filed Dec. 16, 1933   7 Sheets-Sheet 1

INVENTOR
George A. Rutkoskie
BY
Harry Lea Dodson
ATTORNEY

Dec. 29, 1936.  G. A. RUTKOSKIE  2,065,749
PLATEN JOB PRESS OF THE REVOLVING DISK TYPE
Filed Dec. 16, 1933   7 Sheets-Sheet 3

INVENTOR
George A. Rutkoskie
BY
Harry Lea Dodson
ATTORNEY

Dec. 29, 1936.  G. A. RUTKOSKIE  2,065,749
PLATEN JOB PRESS OF THE REVOLVING DISK TYPE
Filed Dec. 16, 1933  7 Sheets-Sheet 4

INVENTOR
George A. Rutkoskie
BY Harry Lea Dodson
ATTORNEY

Dec. 29, 1936.    G. A. RUTKOSKIE    2,065,749
PLATEN JOB PRESS OF THE REVOLVING DISK TYPE
Filed Dec. 16, 1933    7 Sheets-Sheet 5

INVENTOR
George A. Rutkoskie
BY
Harry Lea Dodson
ATTORNEY

Dec. 29, 1936.　　　G. A. RUTKOSKIE　　　2,065,749

PLATEN JOB PRESS OF THE REVOLVING DISK TYPE

Filed Dec. 16, 1933　　　7 Sheets—Sheet 6

INVENTOR
George A. Rutkoskie
BY Harry Lea Dodson
ATTORNEY

Dec. 29, 1936. G. A. RUTKOSKIE 2,065,749
PLATEN JOB PRESS OF THE REVOLVING DISK TYPE
Filed Dec. 16, 1933 7 Sheets-Sheet 7

Patented Dec. 29, 1936

2,065,749

UNITED STATES PATENT OFFICE 2,065,749

PLATEN JOB PRESS OF THE REVOLVING DISK TYPE

George A. Rutkoskie, Athens, Ohio, assignor to The McBee Company, Athens, Ohio, a corporation of Ohio Application December 16, 1933, Serial No. 702,679

4 Claims. (Cl. 101—293)

My invention relates to that class of presses for printing wax carbon spots on sheets of paper.

My invention has for its object to provide a construction whereby the ordinary job press, having a revolving disk such as the well known Chandler and Price press, which is standard construction, may be changed so that it is possible to produce wax carbon spots located in any predetermined position on the paper in as great a variety as is desired. As will be seen from the hereinafter contained description my invention can be applied to a press of this type without destroying its usefulness for ordinary printing work.

My invention has for its further object to provide electrical means to heat the revolving disk.

A further object to provide means to insure the positive rotation of the form rollers.

A further object to provide for the continuous rotation of the vibrator roller.

A further object to provide means whereby the inking rollers may be heated notwithstanding their movement.

Other objects and novel means will be seen from the hereinafter contained description.

My means of accomplishing the foregoing objects may be more readily understood by having reference to the accompanying drawings which are hereunto annexed and are a part of this specification, in which—

Similar reference numerals refer to similar parts throughout the entire description.

Figure 1:
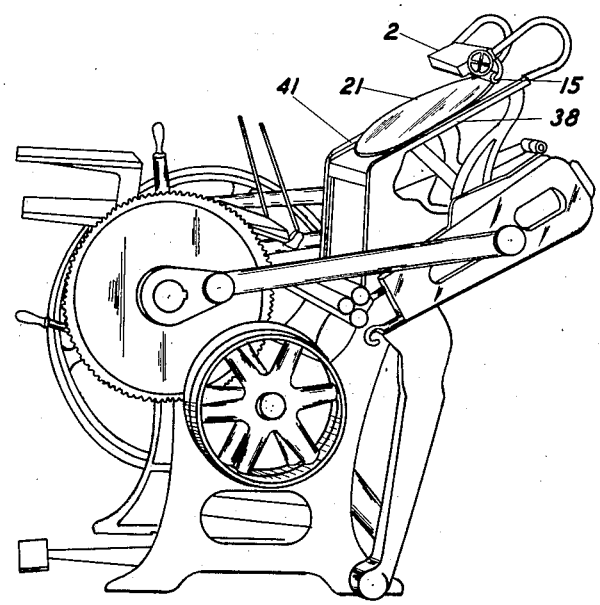
Fig. 1 is a perspective view of one side of the press.

As shown in the drawings, my improvement is shown as stated, on the well known Chandler and Price press, the details of which are so well understood in the trade that I shall not describe them but shall confine my description to such parts as I have added to adapt the press to produce wax carbon spots on sheets of paper.

It is well known that in order to successfully print spots of wax carbon on sheets of paper it is not only necessary to melt the wax carbon in the ink fountain and to maintain it at a predetermined temperature, but all of the parts of the press which come in contact with the wax carbon must also be maintained at the correct temperature.

It has been found in practice that if this temperature varies either up or down beyond a certain predetermined degree the press will be inoperative in so far as producing wax carbon spots which will transfer properly.

In order to accomplish this result, I provide an electric heater 1 for the ink fountain bed 2 which contains the melted wax carbon.

A heating element 3 is located in the ink fountain roller 4 so as to keep it at the desired temperature. As is well understood this roller 4 is intermittently rotated by means of a ratchet 5 and pawls 6 which are standard construction on the press. I extend the shaft 7 of this roller out beyond the ratchet wheel 5 on which I mount slip rings 8 and 9. These slip rings are connected to the heating elements 3 mounted in the ink fountain and the roller and are engaged by brushes 10 and 11 carried by an arm 12 fastened to one side of the press. The brushes 10 and 11 are connected by means of electrical conductors 13 and 14 by a suitable source of electric current supply (not shown). These conductors 13 and 14 are preferably swinging lines.

The melted carbon is carried to the steel ductor roller 15 by means of an intermediate rubber roller 16 which rides the ink fountain roller 4 continually. This roller 16 is driven by means of a gear 17 mounted on the end of its shaft. This gear 17 meshes with a gear 18 mounted on the shaft of the fountain roller 4. Friction gears may, if desired, be substituted for the spur gears illustrated.

Figure 2:
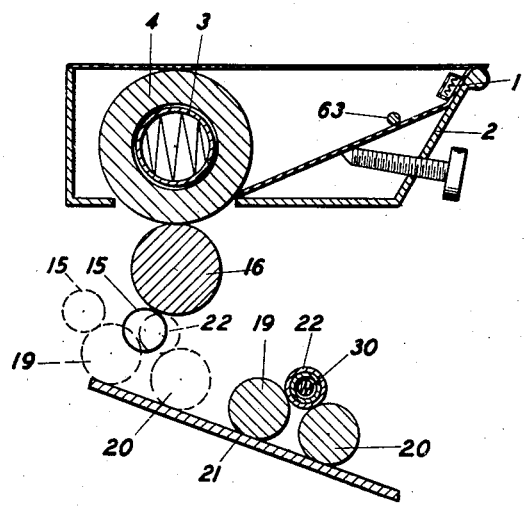
Fig. 2 is an enlarged vertical sectional view of the ink fountain and the inking rollers, the operating mechanism for the rollers being omitted for the sake of clearness.
Figure 3:
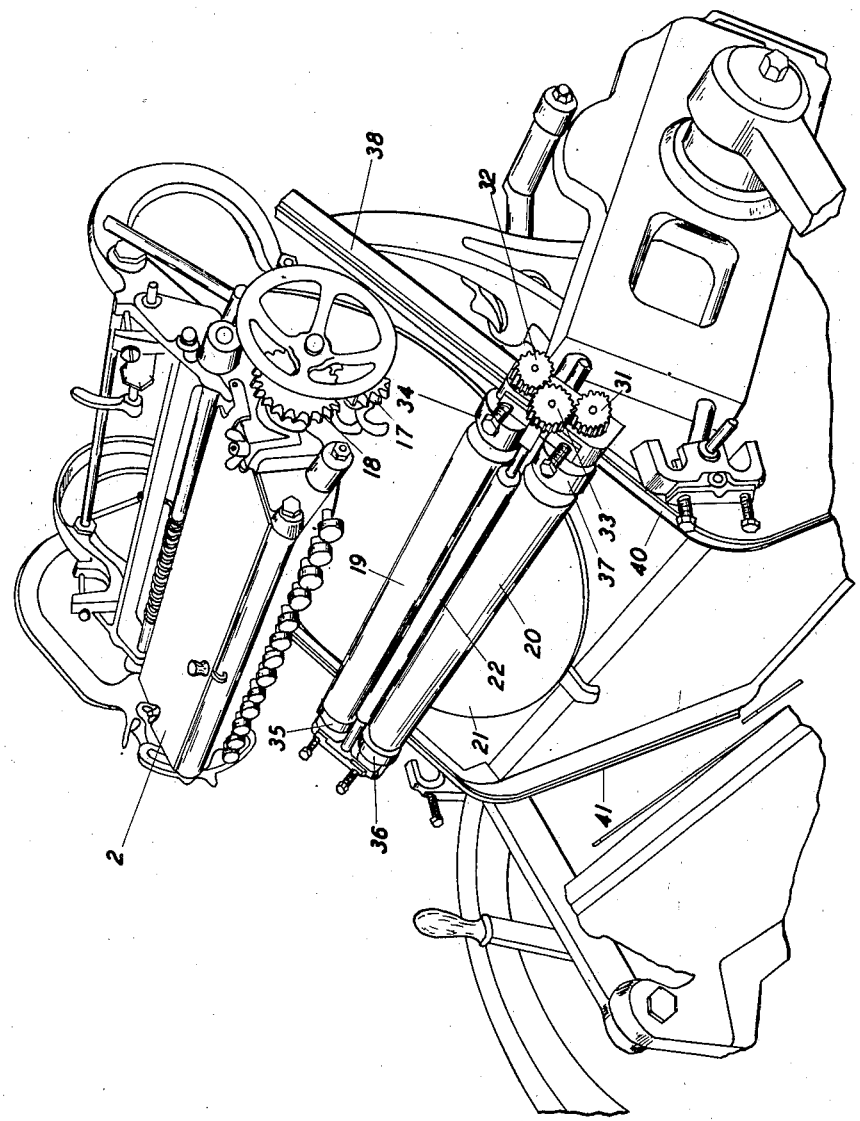
Fig. 3 is a fragmentary perspective view of the upper part of the press showing my improvement.
Figure 4:
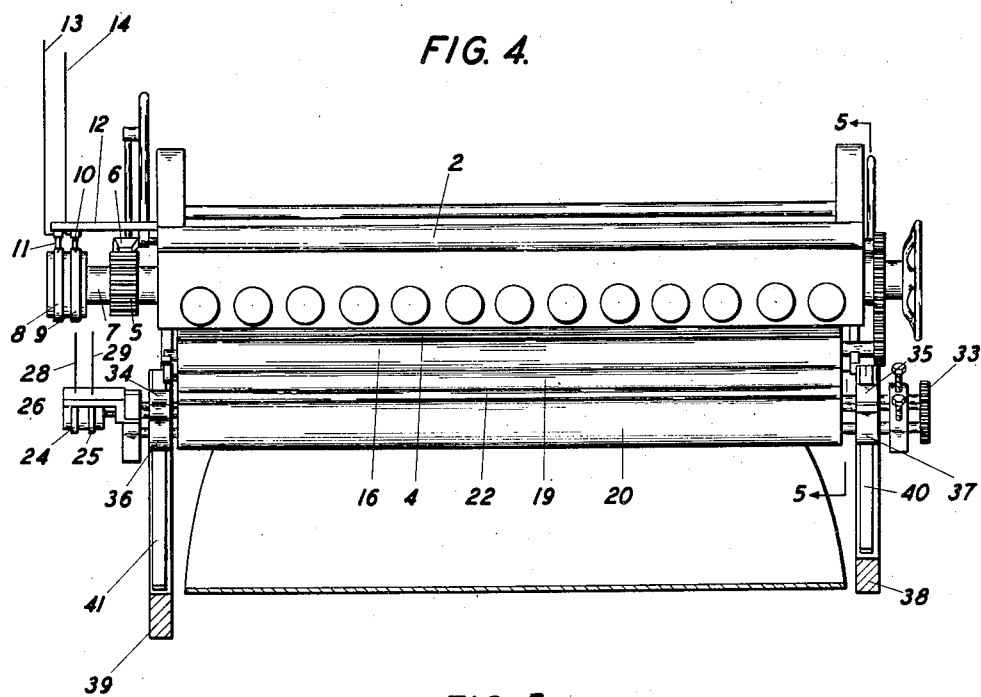
Fig. 4 is a detail view taken from the front of the fountain.
Figure 5:
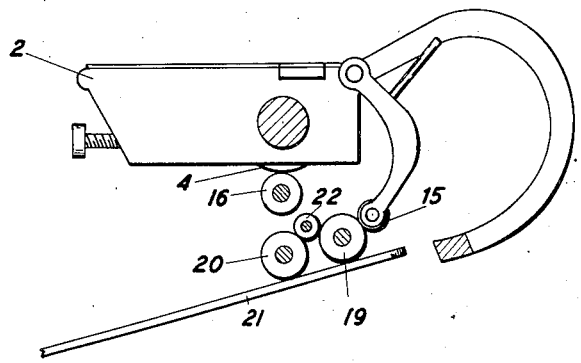
Fig. 5 is a fragmentary detail view showing the movement of the ductor roller.
Figure 6:
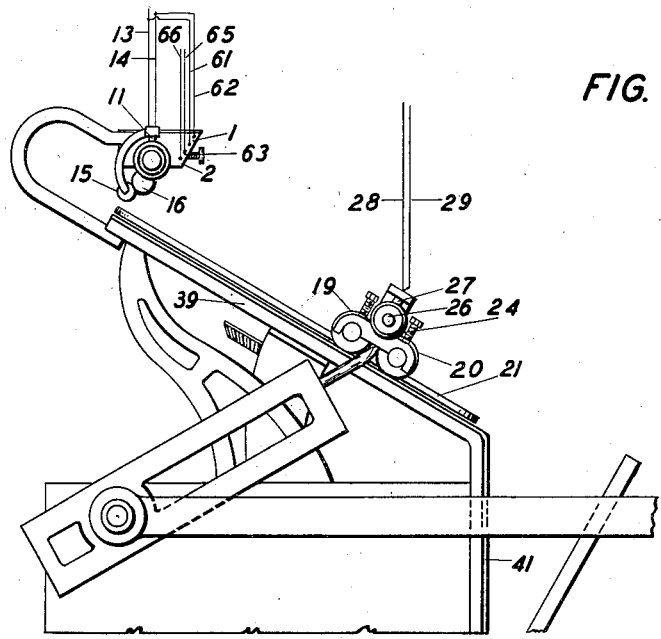
Fig. 6 is a fragmentary detail view on the left hand side of the press showing the upper part of the press and the revolving disk and inking rollers.
Figure 7:
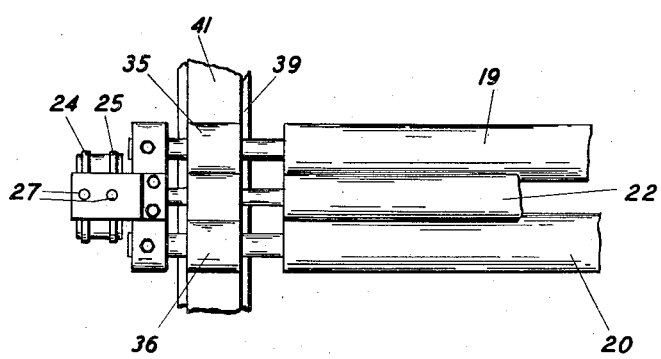
Fig. 7 is an enlarged fragmentary detail view of the inking rollers showing the means for conveying current thereto.

The melted carbon is delivered to the ductor roller by means of an intermediate roller 16. The steel ductor roller 15 swings back and forth between the roller 16 shown as in Fig. 2 and the position indicated in the dotted lines in the same figure. While in the position shown in dotted lines in Fig. 2, the ductor roller 15 is brought in contact with the upper one of the two form rollers 19 and 20 which at this time is nearing its extreme upward stroke.

The rubber form roller 19 takes its supply of melted carbon from the ductor roller 15 and on its downward stroke deposits this carbon on the revolving inking disk 21 where the carbon is evenly distributed by the intermittent revolutions of the inking disk 21. As is understood by persons skilled in the art the movement of the inking plates 21 is brought about by beveled gears (not shown) in the well understood manner.

In order to further facilitate the distribution and to insure that the carbon transferred is kept in a melted condition and at the proper temperature at all times, the rubber form rollers 19 and 20 are heated by a steel vibrator 22 which contains an electric heating element 30 mounted inside of the vibrator 22 which gets its supply of current by the means of slip rings 24 and 25 carried on the end 26 of the vibrator shaft.

These slip rings are arranged to contact with brushes 27 which receive their supply of electric current through conductors 28 and 29 which are flexible swinging lines and lead to a source of electric current supply (not shown).

It has been found that there is not sufficient tack in the melted wax carbon to insure the rotation of the steel vibrator 22 solely by frictional contact with the rubber rollers 19 and 20. Therefore, in order to make this rotation positive, I place a gear 31 on the end of the shaft of the roller 20 and a similar gear 32 on the shaft of the roller 19. These gears 31 and 32 mesh with a spur gear 33 put on the end of the shaft of the vibrator 22. It will be apparent from this that it is impossible for the rollers 19 and 20 to revolve without bringing about a revolution of the vibrator 22.

However, these rollers 19 and 20 are designed to be rotated by means of roller trucks 34 and 35 placed adjacent the ends of the roller 19 and corresponding roller trucks 36 and 37 placed adjacent the ends of the roller 20. This does not necessarily insure positive rotation and there is considerable danger of there being a slippage of the trucks which, while not greatly objectionable in ordinary printing, would be absolutely fatal to the production of successful wax spot carbonizing. I have found in practice that this danger can be completely obviated by mounting on the face of each of the side frames 38 and 39 strips of leather 40 and 41 which are secured to the edge of the frames in any suitable or convenient manner, and are adapted to contact the roller trucks 34, 35, 36 and 37 with the result that I am able to obtain a positive turning of the rubber rollers 19 and 20.

Practice has shown that unless the ink plate is heated the moment that the carbon is delivered to it from the form roller 19, it will crystallize. I avoid this by providing a construction which permits me to maintain the revolving disk ink plate at any predetermined temperature. I accomplish this in the manner clearly shown in Figs. 11 to 14 inclusive and in the wiring diagram; as shown in these views I provide two rings 42 and 43 which are preferably formed of brass or other suitable conducting material. These rings are mounted upon an annular strip of insulator 44 which is secured to the back of the revolving disk ink plate 21. These rings 42 and 43 are connected to annular electrical heating elements 45 and 46 by means of electrical conductors 47 and 48 in the conventional manner. Current is conveyed to the rings 42 and 43 by means of brushes 49 and 50 of standard construction. These brushes are mounted in a support 51 which may be bolted or otherwise secured to the side frame 38 of the press. The brushes are connected to electrical conductors 52 and 53 which lead to a source of electric current supply (not shown).

The result of this construction is obvious. The rotation of the revolving disk plate 21 has no effect whatever on the electrical connections. It is thus possible to convey the requisite amount of current to the heating elements 45 and 46 to maintain the revolving disk at any required temperature.

Figure 8:
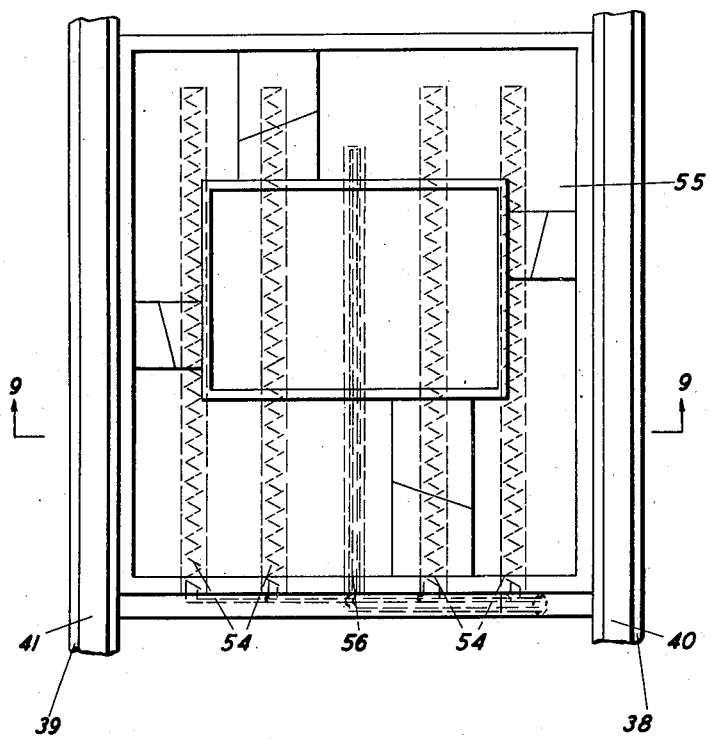
Fig. 8 is a front view of the type bed plate and a portion of the tracks for the inking rollers.
Figure 9:
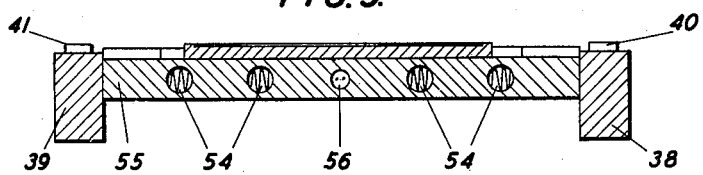
Fig. 9 is a cross section taken on the line 9—9 in Fig. 8.
Figure 10:
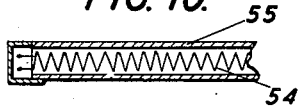
Fig. 10 is a fragmentary detail view of one of the heating elements.
Figure 11:
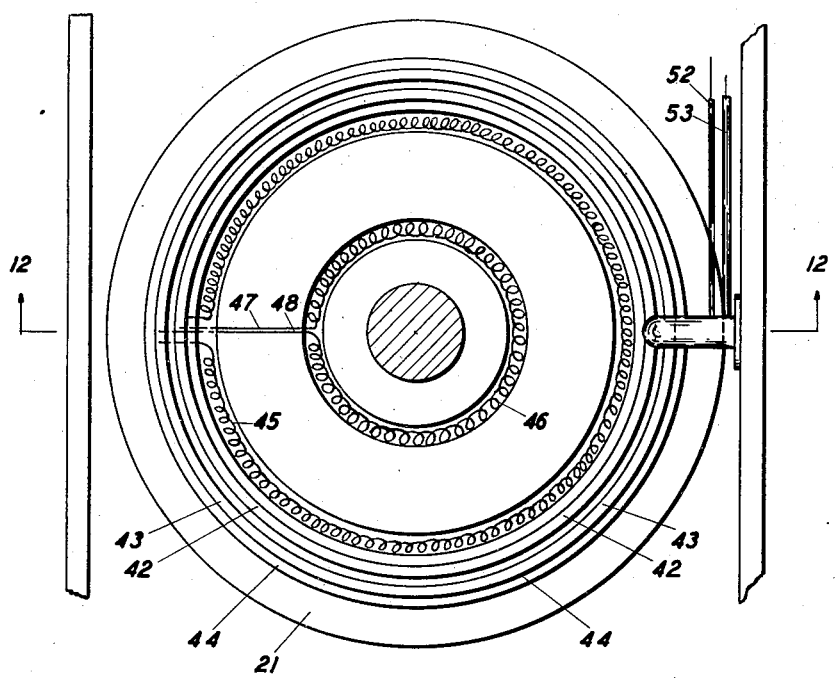
Fig. 11 is a rear view of the revolving inking disk.
Figure 12:
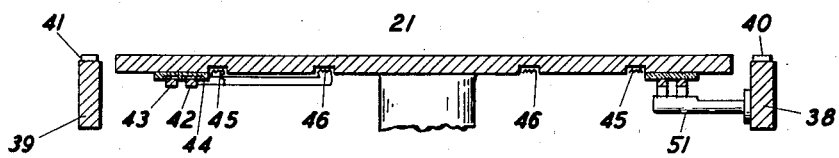
Fig. 12 is a cross section taken on the line 12—12 in Fig. 11.
Figure 13:
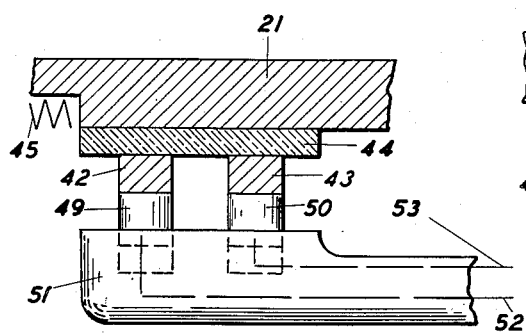
Fig. 13 is an enlarged fragmentary view of the inking disk.
Figure 14:
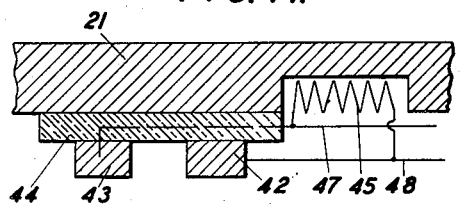
Fig. 14 is an enlarged fragmentary detail view showing the manner of connecting the current to the heating elements on the revolving inking disk.
Figure 15:
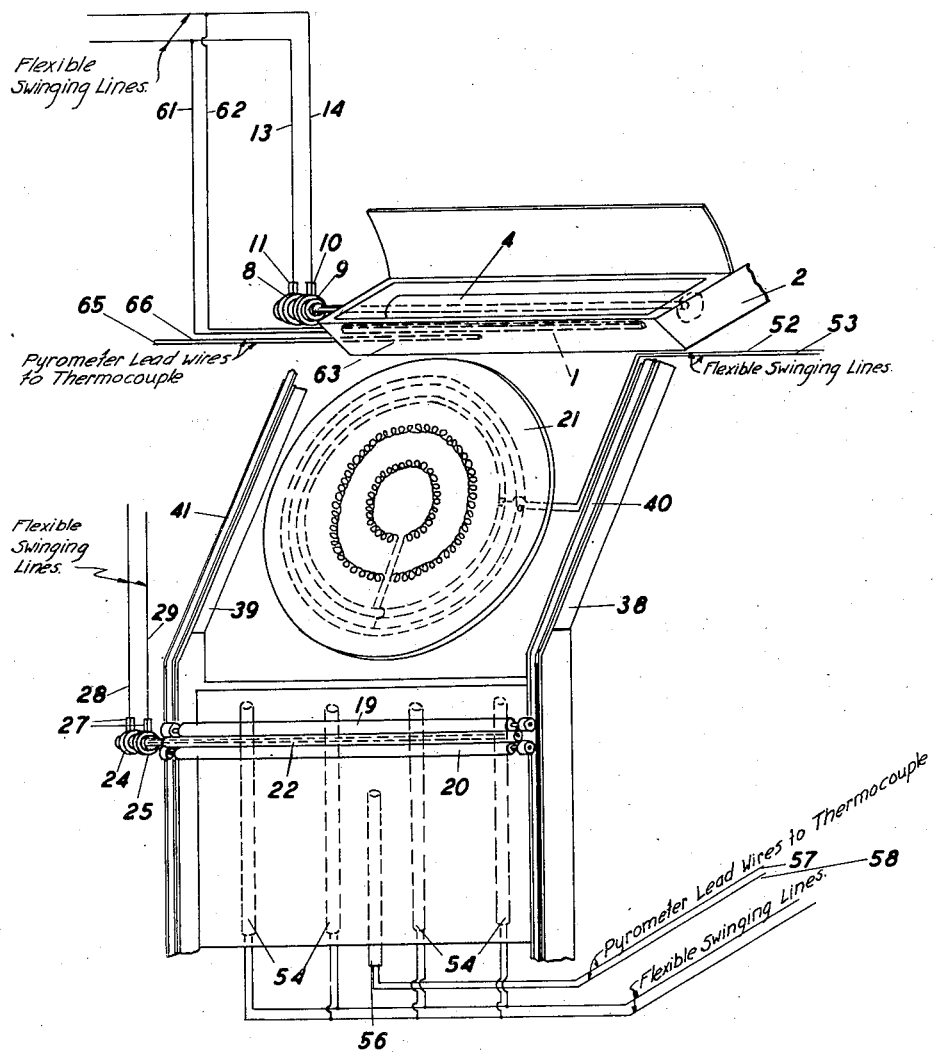
Fig. 15 is a diagrammatic view showing the wiring diagram.

It is also essential that the type bed be heated to a predetermined temperature or it will have the effect of crystallizing the wax carbon when it is sought to deliver it from the rollers 19 and 20. My means of accomplishing this is clearly seen in Figs. 8 to 10 inclusive and in the wiring diagram. I attain this result by mounting a plurality of heating elements 54 in the type bed 55 and I also mount a thermo couple 56 between the elements 54. This thermo couple is connected to pyrometer lead wires 57 and 58 which lead to a pyrometer of standard construction (not shown) for controlling the current supply (not shown).

It will be obvious from the foregoing description, that as long as the heat is turned off, the press can be used for standard purposes and when it is desired to run a job of wax spot carbonizing all that is necessary to do is to turn on the current, place the requisite amount of wax carbon compound in the ink fountain which will be quickly melted by means of an electric heating element 1 mounted in the front of the ink fountain 2. The element being connected by means of electric conductors 61 and 62 to the source of current supply, a thermo couple 63 is mounted adjacent the heating element 1 and is connected by means of lead wires 65 and 66 to the pyrometer and as long as the current is kept turned on all of the necessary parts of the press will be maintained at the correct temperature for spot carbonizing.

Although I have described a specific form of construction for accomplishing the desired objects, it will be obvious to persons skilled in the art that changes may be made without departing from the spirit of my invention and I do not desire to limit except as such limitations may appear in the hereinafter contained claims.

Having described my invention what I regard as new and desire to secure by Letters Patent is:

1. The combination with a printing press having a bed and movable platen with inking means including a revolving inking disk and form rollers, adapted to be moved across and in contact with said bed and disk, of a heated ink fountain, fountain roller and vibrator roller in said inking means, electrical heating elements in said inking disk, stationary contacts carried by the press and engaging the disk to supply electrical current to the same during rotation, and means for heating said bed.

2. The combination with a printing press having a bed and movable platen with inking means including a revolving inking disk and form rollers adapted to be moved across and in contact with said bed and disk, of a heated ink fountain, fountain roller and vibrator roller in said inking means, electrical heating elements in the underside of said disk, conducting rings on the underside of the disk connected with the heating elements, stationary brushes carried by the press in constant contact with said rings during rotation of the disk, a source of electrical current connected with said brushes, and means for heating the bed of the press.

3. The combination with a printing press having a bed and movable platen with inking means including an ink fountain, fountain roller, revolving inking disk and a travelling vibrator and form roller assembly adapted to be moved across and in contact with said bed and disk, of means for heating the fountain, fountain roller, revolving disk and bed of the press, a positive drive connection between the form rollers and vibrator roller to insure rotation of all rollers during movement of the assembly, an electrical heater element in the vibrator roller, and means for supplying electrical current thereto during rotation and movement of said roller.

4. The combination with a printing press having a bed and movable platen with inking means including a revolving inking disk above said bed and form rollers adapted to be moved across and in contact with said bed and disk, of means for continuously heating the inking medium during delivery from a source of supply by the form rollers to the bed including electrical heating elements in the revolving disk, and stationary conductor brushes carried by the press and contacting with the disk to supply an electric current to the heating elements contained therein.

GEORGE A. RUTKOSKIE.